US010064415B2

(12) United States Patent
Thrane et al.

(10) Patent No.: US 10,064,415 B2
(45) Date of Patent: Sep. 4, 2018

(54) DEVICE AND METHOD FOR SCALDING SLAUGHTERED POULTRY (71) Applicant: LINCO FOOD SYSTEMS A/S, Trige (DK)

(72) Inventors: Uffe Thrane, Hammel (DK); Ole Bach, Ebeltoft (DK)

(73) Assignee: Linco Food Systems A/S, Trige (DK)

( * ) Notice: Subject to any disclaimer, the term of this patent is extended or adjusted under 35 U.S.C. 154(b) by 0 days.

(21) Appl. No.: 15/555,067

(22) PCT Filed: Mar. 21, 2016

(86) PCT No.: PCT/EP2016/056113
§ 371 (c)(1),
(2) Date: Aug. 31, 2017

(87) PCT Pub. No.: WO2016/150904
PCT Pub. Date: Sep. 29, 2016

(65) Prior Publication Data
US 2018/0035683 A1 Feb. 8, 2018

(30) Foreign Application Priority Data

Mar. 26, 2015 (DE) .................. 10 2015 104 652

(51) Int. Cl.
*A22B 5/00* (2006.01)
*A22C 21/04* (2006.01)
*A22B 5/08* (2006.01)
(52) U.S. Cl.
CPC ............... *A22C 21/04* (2013.01); *A22B 5/08* (2013.01)
(58) Field of Classification Search
CPC .............................. A22C 21/00; A22C 21/04
(Continued)

(56) References Cited

U.S. PATENT DOCUMENTS 4,852,215 A * 8/1989 Covell, III ............... A22B 5/08
452/79
4,868,950 A * 9/1989 Harben, Jr. ............ A22C 21/04
452/198
(Continued)

FOREIGN PATENT DOCUMENTS

DE      60102369 T2    3/2005
EP      0468461 A1     1/1992
(Continued)

OTHER PUBLICATIONS

International Preliminary Report on Patentability dated Sep. 26, 2017 from International Patent Application No. PCT/EP2016/056113, filed Mar. 21, 2016.
(Continued)

*Primary Examiner* — Richard T Price, Jr.
(74) *Attorney, Agent, or Firm* — Sunstone IP (57) ABSTRACT The invention concerns an apparatus, configured and adapted for scalding slaughtered poultry, comprising a linear scalding tank open at the top for receiving and holding a scalding medium, with at least one transport line for the poultry, wherein each transport line in its longitudinal extension borders a partition element extending over at least part of the length of the transport line, a transport means arranged above the scalding tank for transporting the poultry suspended by the feet along the transport line in the transport direction, a control and regulating unit for tempering the scalding medium, means for generating turbulence and/or flow in the scalding medium, and a filtering device for cleaning the scalding medium, which is distinguished in that each partition element comprises two partition walls spaced apart from each other and extending upward from the base wall of the scalding tank to form a channel open at the top and at the end sides, and inside the channel in the region of openings in each partition wall facing a transport line, a (Continued)

turbulence-generating body is arranged as a means for generating turbulence and/or flow in the scalding medium, which can be rotatably driven by means of a horizontally oriented drive shaft running transversely to the transport direction of the poultry. The invention furthermore concerns a corresponding method.

20 Claims, 8 Drawing Sheets

(58) Field of Classification Search
USPC .................................. 452/71, 73, 74, 80, 81
See application file for complete search history.

(56) References Cited

U.S. PATENT DOCUMENTS

| | | | | |
|---|---|---|---|---|
| 5,326,308 | A * | 7/1994 | Norrie | A22B 5/08 |
| | | | | 452/77 |
| 6,551,182 | B2 * | 4/2003 | Caracciolo, Jr. | A22C 21/0061 |
| | | | | 452/81 |
| 7,217,437 | B2 | 5/2007 | Van Stuyvenberg | |
| 7,465,223 | B2 * | 12/2008 | Zachariassen | A22C 21/04 |
| | | | | 452/74 |
| 8,012,002 | B2 * | 9/2011 | Brown | A22B 5/0082 |
| | | | | 452/173 |
| 8,062,105 | B2 * | 11/2011 | Aandewiel | A22C 21/04 |
| | | | | 452/74 |
| 8,066,556 | B2 * | 11/2011 | Kjeldsen | A22C 21/04 |
| | | | | 452/76 |
| 8,246,429 | B2 * | 8/2012 | Hilgren | A22C 21/0061 |
| | | | | 452/123 |
| 8,444,459 | B2 * | 5/2013 | Van Den Griend | A22C 21/04 |
| | | | | 452/77 |
| 8,572,864 | B2 * | 11/2013 | Wieck | A22B 5/0082 |
| | | | | 34/381 |
| 8,684,799 | B2 * | 4/2014 | Brink | A22C 21/0061 |
| | | | | 452/173 |
| 2004/0101602 | A1 | 5/2004 | Van Stuyvenberg | |
| 2007/0141971 | A1 | 6/2007 | Aandewiel et al. | |
| 2007/0181010 | A1 | 8/2007 | Van Stuyvenberg | |
| 2009/0215368 | A1 | 8/2009 | Van Den Griend et al. | |

FOREIGN PATENT DOCUMENTS

| | | |
|---|---|---|
| EP | 1787519 A1 | 5/2007 |
| KR | 2019840000937 Y1 | 5/1984 |
| KR | 1020120107149 A1 | 9/2012 |
| KR | 1020140041091 A1 | 4/2014 |
| NL | 1009188 C2 | 11/1999 |

OTHER PUBLICATIONS

International Search Report and Written Opinion dated Jun. 28, 2016 from International Patent Application No. PCT/EP2016/056113, filed Mar. 21, 2016.
Notice of Allowance dated Apr. 12, 2018 from Korean Patent Application No. 10-2017-7028057.

* cited by examiner

DEVICE AND METHOD FOR SCALDING SLAUGHTERED POULTRY

The invention concerns an apparatus configured and designed for scalding slaughtered poultry, comprising a linear scalding tank open at the top for receiving and holding a scalding medium, with at least one transport line for the poultry, wherein each transport line in its longitudinal extension borders a partition element extending over at least part of the length of the transport line, a transport medium arranged above the scalding tank for transporting the poultry suspended by the feet along the transport line in the transport direction T, a control and regulating unit for tempering the scalding medium, means for generating turbulence and/or flow in the scalding medium, and a filtering device for cleaning the scalding medium.

The invention furthermore concerns a method for scalding slaughtered poultry with the steps: transport of the poultry G suspended by its feet through a scalding tank filled at least partially with scalding medium, by means of a transport means along a transport line in transport direction T, tempering of the scalding medium by means of a control and regulating unit, cleaning of the scalding medium by means of a filter device, and generating of turbulence in the scalding medium by a means for generating turbulence and/or flow.

Such apparatuses and methods are used in the poultry-processing industry for preparing the plumage of the poultry, such as chickens, turkeys, ducks, geese and other birds and water fowl processed in the food industry, for actual de-feathering or plucking of the feathers, in that the feathers are quasi softened or loosened by the warmed/heated scalding medium in the region of the quill. For this, the bird is exposed to warm or hot water vapour or—as in the generic apparatus—transported through a scalding tank filled with a scalding medium. On transport of the poultry suspended by its feet along the transport line in the transport direction T, each poultry body is immersed partly or fully in and is rinsed by the scalding medium. The scalding medium, normally water, may be additionally enriched by air or additives added to the scalding medium.

EP 1 787 519 A1 discloses a scalding apparatus with the features of the preamble of claim 1. In this apparatus, the scalding tank is divided into two transport lines by a partition wall. On either side of the partition wall, in the area of the scalding tank base, upwardly directed nozzles are arranged as means for generating a turbulence and/or flow in the scalding medium. By means of these nozzles, a vertically upwardly directed flow of scalding medium over the bird can be generated. Guide means in the upper part of the scalding tank ensure that this flow is deflected and directed downward in the direction of the bird. The partition wall acts as a heat exchanger inside the scalding tank and is used in the known apparatus as a control and regulating unit for tempering the scalding medium. The poultry transported along the transport lines is directly exposed to the radiant heat of the heat exchanger when the poultry passes over the partition wall. This can lead to overheating of the bird and hence to damage of the skin and flesh. By generating a flow in the scalding medium using the nozzles, the scalding medium is disturbed in particular on the surface of the scalding medium in the scalding tank, leading to a loss of heat at the surface of the scalding medium which must be compensated by the supply of additional energy. A further disadvantage is that nozzles, as a means for creating the flow in the scalding medium, require a high energy input, in particular since a plurality of nozzles is required along the transport line in order to create the necessary flow over the entire length. Furthermore, the apparatus of EP 1 787 519A is difficult to clean.

The invention is therefore based on the object of creating an apparatus for scalding slaughtered poultry which is cheap to produce and operate, and simple to handle. The object is furthermore to propose a corresponding method.

This object is achieved by the apparatus with the features cited hereinbefore, in that each partition element comprises two partition walls spaced apart from each other and extending up from the base wall of the scalding tank to form a channel open at the top and at the end sides, and as a means for creating the turbulence and/or flow in the scalding medium, a turbulence-generating body is arranged inside the channel in the region of openings in each partition wall facing a transport line, which body can be rotatably driven by means of a horizontally aligned drive shaft running transversely to the transport direction T of the poultry. The channel formed by the partition walls and at least partially shielded from the or each transport line is open both at the top and at both end sides, so that the scalding medium—in a resting state of the turbulence-generating body—has a uniform level inside the entire scalding tank, i.e. it has the same level inside the channel as in the transport lines since an open connection exists between the or each transport line and the or each channel. There is also a connection between the transport line and the channel for the passage of the scalding medium in the region of the openings in the partition walls. Because the turbulence-generating body is arranged inside the channel and outside the transport lines, the scalding medium can be drawn through the openings from the base of the transport line by the rotation of the turbulence-generating body, whereby a positive pressure exists inside the channel over its entire length. By drawing the scalding medium into the channel, the poultry can be helped to remain in a substantially vertical orientation in order to prevent a floating of the poultry. The positive pressure inside the channel expels the scalding medium out of the channel at the open end sides and/or at the open top, so that the poultry is optimally exposed to the scalding medium. With the horizontal orientation of the transport shaft transversely to the transport direction T of the poultry i.e. transversely to the longitudinal extension of the transport lines, it is possible on the one hand to provide different sizes of turbulence-generating body. On the other hand, this configuration according to the invention allows several turbulence-generating bodies to be arranged on the same drive shaft, which can all be rotatably driven by means of a single drive. This allows cheap construction and operation of the apparatus.

A particularly preferred refinement of the invention is distinguished in that at least two parallel transport lines are arranged in the scalding tank and are partially separated from each other in their longitudinal extension by the partition element. The or each partition wall of the partition element is formed spaced from the outer wall of the scalding tank at least at the reversal point of the transport means, on a change from the first transport line to the adjacent transport line, in order to allow the poultry to pass or change from one transport line to the next. The duplication of the transport lines extends the duration for which the poultry remain in the scalding medium, without reducing the output of scalded poultry bodies at the outlet from the apparatus.

Advantageously, more than two parallel transport lines are formed in the scalding tank, wherein two adjacent transport lines are at least partially separated from each other by a partition element. With this configuration, the effect described above is further reinforced.

A particularly suitable embodiment of the invention is distinguished in that the turbulence-generating bodies comprise at least one impeller, propeller or similar. Particularly preferably, a vortex water turbine is provided as a turbulence-generating body, which has a very high pumping rate at a very low rotation speed (e.g. 300 rpm) and hence ensures energy-efficient generating of the turbulence and/or flow. A particular advantage of the design according to the invention is that due to the impeller, propeller or turbine, because of the high pumping rate, a single pumping station—preferably arranged centrally—is sufficient to generate adequate turbulence/flow within the apparatus of a length of up to 10 m.

Suitably, the turbulence-generating body comprises at least two impellers, propellers or similar which are arranged on the same drive shaft. Because the drive shaft is arranged horizontally and transversely to the transport direction T, a plurality of turbulence-generating bodies can be arranged on the same drive shaft, so that scalding apparatuses with up to eight transport lines, preferably with two to four transport lines, can be operated particularly cost-efficiently via this one central pumping station formed by the drive shaft, the turbulence-generating bodies arranged thereon and the drive for the drive shaft.

A proposed refinement of the invention is characterised in that at least one deflection element is arranged at both end sides of each channel in the region of the partition walls, for deflecting the flow of scalding medium flowing out of the channel at the end sides in the transport direction T of the poultry. The deflection element is arranged and oriented at the end sides such that scalding medium flowing out of the channel is conducted only to one transport line. The deflection elements cause the scalding medium to flow into the transport lines in the transport direction T. In other words, the poultry can always be transported with the flow direction of the scalding medium in the transport line, which effectively prevents floating of the birds.

An advantageous embodiment is distinguished in that in the region of the channel open at the top, impact elements are provided for deflecting the scalding medium flowing up out of the channel, to flow down in the direction of the poultry. Thus, on the one hand, a pressure can be exerted on the bird from above. This pressure generated by the flow of scalding medium leads to the poultry remaining oriented substantially vertically, hanging down, and prevents floating of the poultry so that the bird is always immersed to the maximum in the scalding medium. On the other hand, because of this configuration, the scalding medium can flow directly into the region of the quills in order to improve the loosening of the feathers.

Advantageously, the impact elements extend substantially over the entire length of the channel and are configured and designed to deflect the scalding medium from the channel optionally into the one and/or the other transport line. This means that an impact element or several impact elements are provided, which are arranged on the upper edge of the partition walls and, depending on the configuration and arrangement of the impact elements, deflect the scalding medium flowing up out of the channel either to the one side and/or to the other side of the channel, so that the scalding medium flows either into one of the two transport lines or into both transport lines, so that the poultry is charged with the flow of transport medium from above over the entire length of the transport lines.

A suitable refinement is characterised in that the two partition walls forming a channel are configured to be pivotable for maintenance and/or cleaning purposes. This substantially simplifies maintenance of the apparatus and in particular cleaning of the scalding tank.

Advantageously, in the region of the base wall of the scalding tank, each partition wall is fitted with a hinge or similar for pivoting the partition walls out of a parallel operating position into a V-shaped maintenance and/or cleaning position and back. In other words, the partition walls are attached to the base of the scalding tank by hinges. Instead of the hinges, other components allowing a pivot movement could be used. This configuration allows particularly simple cleaning of the channel.

A preferred embodiment is characterised in that each turbulence-generating body in the region of the openings is shielded from the transport lines by a protection element which is permeable to the scalding medium. Thus, the risk of collision of a bird with the turbulence-generating body during transport along the transport line is effectively prevented.

In a particularly preferred embodiment of the invention, at least one heat source of the control and regulating unit for tempering the scalding medium is arranged inside the channel. In this way, the bird is shielded from the heat source, e.g. a heat exchanger, of the control and regulating unit, whereby damage to the bird is avoided. The scalding medium heated/warmed in the channel is mixed with the scalding medium in the scalding tank before hitting the poultry, whereby an even heat distribution is achieved for a scalding process which protects the bird but is still effective, in order to improve the quality.

The object is achieved also by a method with the steps cited hereinbefore in that, in a channel which is at least partially shielded from the or each transport line, a turbulence is generated in the scalding medium by means of a turbulence-generating body which is rotatably driven about a horizontally oriented drive shaft running transversely to the transport direction T, and the scalding medium is then returned to the or each transport line.

Preferably, the scalding medium from the or each transport line is drawn into the channel by means of the turbulence-generating body, and hence a positive pressure is generated in the channel which ensures that the scalding medium emerges at the end sides and/or at the top of the channel and is returned to the transport lines.

An advantageous refinement is distinguished in that the scalding medium emerging from the end sides of the channel is deflected by the deflection elements such that the emerging scalding medium flows in the transport direction T of the poultry G.

Suitably, the scalding medium emerging up out of the channel is deflected by the impact elements such that the suspended poultry G is charged with the emerging scalding medium from top to bottom.

A preferred variant provides that the poultry G is transported along the transport lines through a scalding tank which is only partly filled with scalding medium, so that the poultry G is not or is only partly immersed in the scalding medium, and is completely or mainly charged with the scalding medium flowing up out of the channel. This completely avoids the effect of flotation of the bird, and the feathers in the immediate area of the quill are charged with the scalding medium against the growth direction.

An alternative variant provides that the poultry G is transported along the transport lines through a scalding tank which is completely filled with scalding medium, so that the poultry G is immersed completely in the scalding medium and charged with the scalding medium standing in the transport lines and the scalding medium flowing up and/or at the end sides out of the channel. Because of the high level of scalding medium with only a low turbulence of the surface of the scalding medium, the loss of heat from the scalding medium to the environment is significantly reduced.

Advantageously, the scalding medium inside the channel is tempered by the control and regulating unit, wherein on emergence from the channel, the scalding medium tempered in the channel mixes with the scalding medium present in the transport lines and this mixture of scalding medium then hits the poultry G.

A particularly advantageous refinement proposes that the method is executed with an apparatus according to any of claims 1 to 12.

The advantages arising from the method steps according to the invention have already been described in connection with the apparatus according to the invention which is particularly suitable for performance of the method, so to avoid repetition, reference is made to the corresponding passages.

Further suitable and/or advantageous features and refinements of the invention arise from the sub-claims and the description. A particularly preferred embodiment of the invention is explained below in more detail with reference to the enclosed drawing. This shows:

The apparatus shown in the drawing serves for scalding chickens hanging upside down, which are transported inside a scalding tank with a very high level of scalding medium, namely such that the chickens are fully immersed below the surface of the scalding medium so that the chickens are charged with the scalding medium standing in the transport line and also to the scalding medium flowing out at the end sides and up out of the channel. Evidently the level of the scalding medium may be lower, such that the chickens are not immersed at all or are only partially immersed in the scalding medium, for example as far as the neck, so that the chickens are exclusively or fully charged with the scalding medium flowing up out of the channel. The invention can here be used accordingly for turkeys, ducks, geese and other birds and water fowl.

Figure 1:
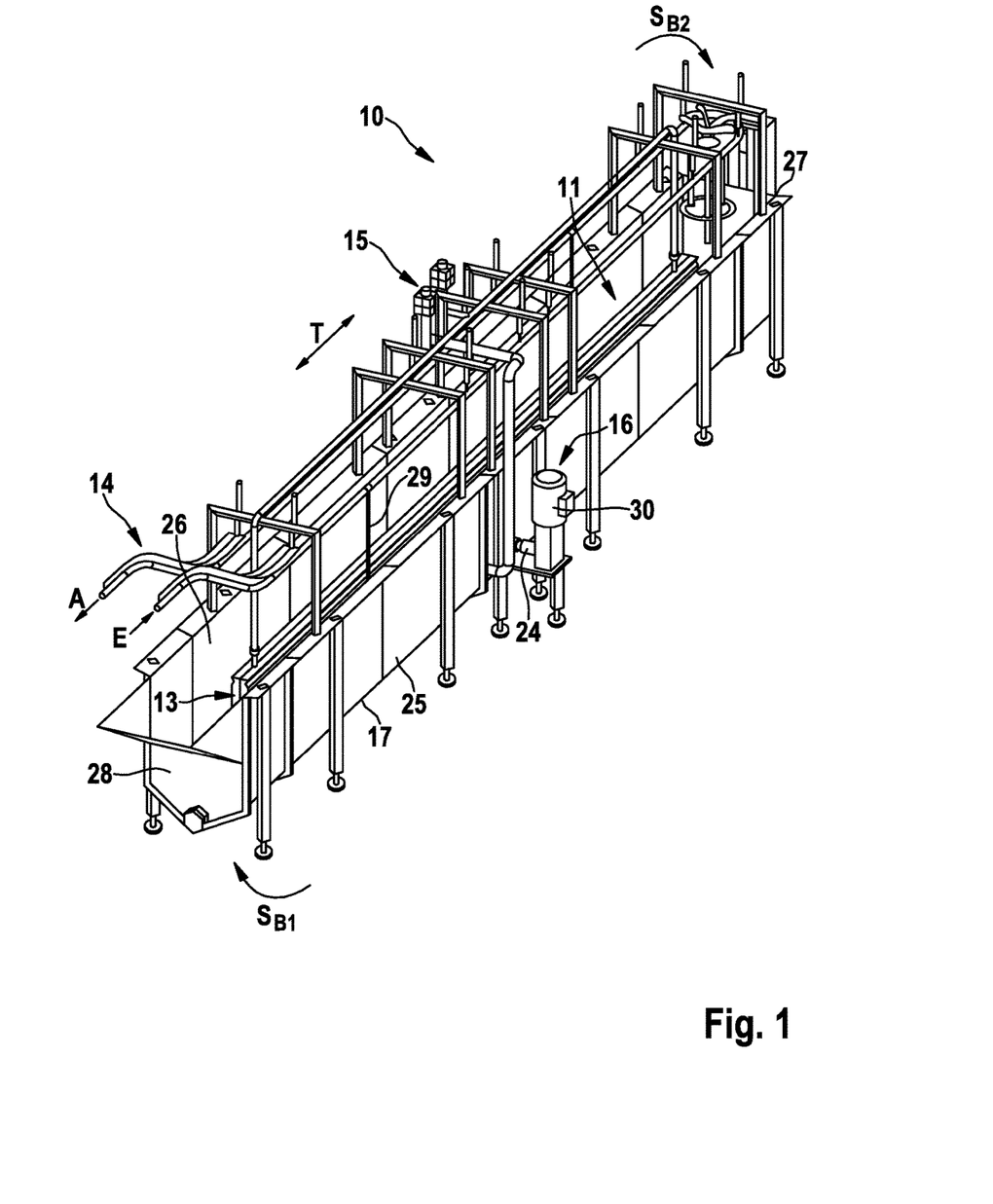
FIG. 1 a diagrammatic depiction of the apparatus according to the invention in an oblique perspective view from above and the front, FIG. 2 the apparatus according to FIG. 1 in top view, FIG. 3 an enlarged depiction of the extract III according to FIG. 2, FIG. 4 an enlarged depiction of the turbulence-generating body in top view, FIG. 5 an enlarged depiction of the turbulence-generating body in perspective view, FIG. 6 the apparatus according to FIG. 2 in section VI-VI, FIG. 7 the apparatus according to FIG. 2 in section VII-VII, FIG. 8 a perspective, detailed view of a portion of a transport line, wherein to clarify the view an outer wall of the scalding tank has been removed, and FIG. 9 a diagrammatic depiction of the function principle of a vortex water turbine.

FIG. 1 shows an apparatus 10 which is configured and designed for scalding slaughtered poultry G. The apparatus 10 comprises a linear scalding tank 11 open at the top for receiving and holding a scalding medium, with at least one transport line 12.1 for the poultry G, wherein each transport line 12.1 in its longitudinal extension borders a partition element 13 extending at least over part of the length of the transport line 12.1. Furthermore, the apparatus 10 comprises a transport means 14 arranged above the scalding tank 11 to transport the poultry G suspended by the feet along the transport line 12.1 in the transport direction T, and a control and regulating unit 15 for tempering the scalding medium. Furthermore, the apparatus 10 comprises means 16 for generating a turbulence and/or flow in the scalding medium, and a filter device 35 for cleaning the scalding medium.

This apparatus 10 according to the invention is distinguished in that each partition element 13 comprises two partition walls 18, 19 arranged spaced apart from each other and extending up from the base wall 17 of the scalding tank 11, to form a channel 20 open at the top and at the end sides $S_{K1}$, $S_{K2}$, and as a means for generating turbulence and/or flow in the scalding medium, a turbulence-generating body 23 is arranged inside the channel 20 in the region of openings 21, 22 in each partition wall 18, 19 facing a transport line 12.1, which body can be rotatably driven by means of a horizontally oriented drive shaft 24 running transversely to the transport direction T of the poultry G. An individual turbulence-generating body 23 may extend over the entire channel width so that the single turbulence-generating body 23 extends into the region of both openings 21, 22. However, a separate turbulence-generating body 23 may also be arranged in the region of each opening 21, 22.

The features and refinements described below constitute preferred embodiments, either alone or in combination. It is expressly pointed out that features combined in the claims and/or description, or described in a common embodiment, may also functionally independently refine the apparatus 10 described above.

The scalding tank 11 is a trough-like body which is limited at the bottom by a base wall 17 and at the sides by the side walls 25, 26. The scalding tank 11 extends longitudinally in the transport direction T. The end walls 27, 28, which are substantially shorter than the side walls 25, 26 which they face, delimit the scalding tank 11 to form the receiving volume for the scalding medium so that this may be received and held, i.e. stored. The scalding medium may be water or another fluid, for example water enriched with at least one additive or similar. The base wall 17 may be horizontal and flat or, as shown in FIG. 1, also V-shaped. The scalding tank 11 may be formed integrally, or in modular or segment form, and in the variant shown has a total length of preferably around 8 m. The dimensions of the scalding tank 11 may however vary.

With the apparatus 10 shown in the drawing, in the scalding tank 11 at least two parallel transport lines 12.1, 12.2 are arranged which are at least partially separated from each other in their longitudinal extension by the partition element 13. The poultry are both introduced and discharged at one of the end sides $S_{B1}$ of the scalding tank 11. The transport means 14 in the preferred embodiment is a suspension conveyor configured as an overhead conveyor, on which the poultry G are transported suspended by their feet in shackles 29 along the transport line 12.1, 12.2. The suspension conveyor or its conveyor rail is designed meandering such that the conveyor rail is deflected by 180° at the end side $S_{B2}$ opposite the inlet and outlet, in order to allow the poultry G to change from one transport line 12.1 to the other transport line 12.2. Accordingly, the partition element 13 is spaced from the end wall 27 of the scalding tank 11, at least on the side facing the end side $S_{B2}$. Apparatuses 10 are also formed in the manner described above, in which more than two parallel transport lines 12.1, 12.2, . . . 12.n are formed in the scalding tank 11. In this case, two adjacent transport lines 12.1, 12.2, . . . 12.*n* are at least partially separated from each other by a partition element 13. The suspension conveyor or its conveyor rail is deflected meander-like accordingly. In the case that more than two transport lines 12.1, 12.2, . . . 12.*n* are provided, each partition element 13 is also formed spaced from the end wall 28 of the scalding tank 11 on the end side $S_{B1}$ in the region of the inlet and outlet.

In the shown embodiment, the turbulence-generating body 23 is arranged centrally. In other words, the or each turbulence-generating body 23 is arranged approximately centrally relative to the length of the transport lines 12.1, 12.2, . . . 12.*n* on a single drive shaft 24 which can be rotatably driven by means of a single drive 30. The drive shaft 24 is mounted in the side walls 25, 26 of the scalding tank 11, and optionally also in the partition walls 18, 19 of the partition element 13. The turbulence-generating body 23 comprises at least one impeller, propeller or turbine or other turbulence-generating element. Particularly preferably, the turbulence-generating body 23 comprises at least one vortex water turbine which is arranged between the two partition walls 18, 19 in the region of the openings 21, 22, and has a very high pumping volume at low rotation speed (e.g. 300 rpm). When one vortex water turbine is used, this may comprise one rotor blade or two rotor blades. In the case that two rotor blades are provided, these may be separated from each other by a partition wall or similar. If the vortex water turbine has only one rotor blade which faces only one partition wall 18, 19, scalding medium is only drawn out from the transport line 12.1, 12.2, . . . 12.*n* to which the rotor blade is directed. If two rotor blades form the vortex water turbine, a rotor blade is associated with both transport lines 12.1, 12.2, . . . 12.*n* lying adjacent to channel 20, by means of which rotor blade the scalding medium may be drawn out in order to create the overpressure inside channel 20. Alternatively, the or each turbulence-generating body 23 may also be arranged excentrically and particularly at the end sides $S_{K1}$, $S_{K2}$ of channel 20. In case turbulence-generating body 23 is a vortex water turbine, this may preferentially be arranged at the end side $S_{K1}$ of channel 20 facing inlet E and outlet A inside the channel.

In the region of the preferably U-shaped channel 20, in one partition wall 18, 19 or in both partition walls 18, 19, the turbulence-generating body 23 may comprise an impeller or propeller in the region of openings 21, 22. In the case that several channels 20 lie next to each other parallel and spaced apart, it is possible that a vortex water turbine or one or two impellers or propellers are arranged in each channel 20, wherein all vortex water turbines and/or impellers and/or propellers of an apparatus 10 are arranged on the same drive shaft 24. Optionally, several scalding tanks 11 may be arranged adjacent to each other as modules so that one drive shaft 24 extends through several scalding tanks 11 and is mounted therein to carry and drive all turbulence-generating bodies 23 of an arrangement comprised of two or more scalding tanks 11.

Figure 3:
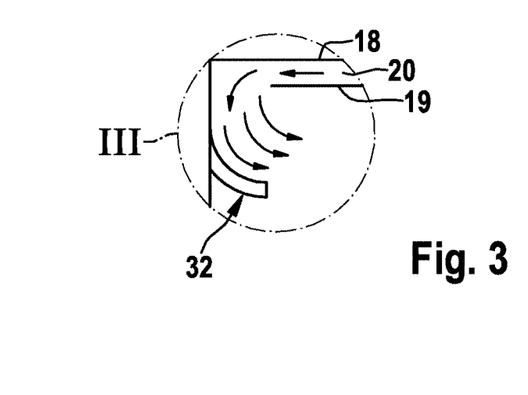
Figure 4:
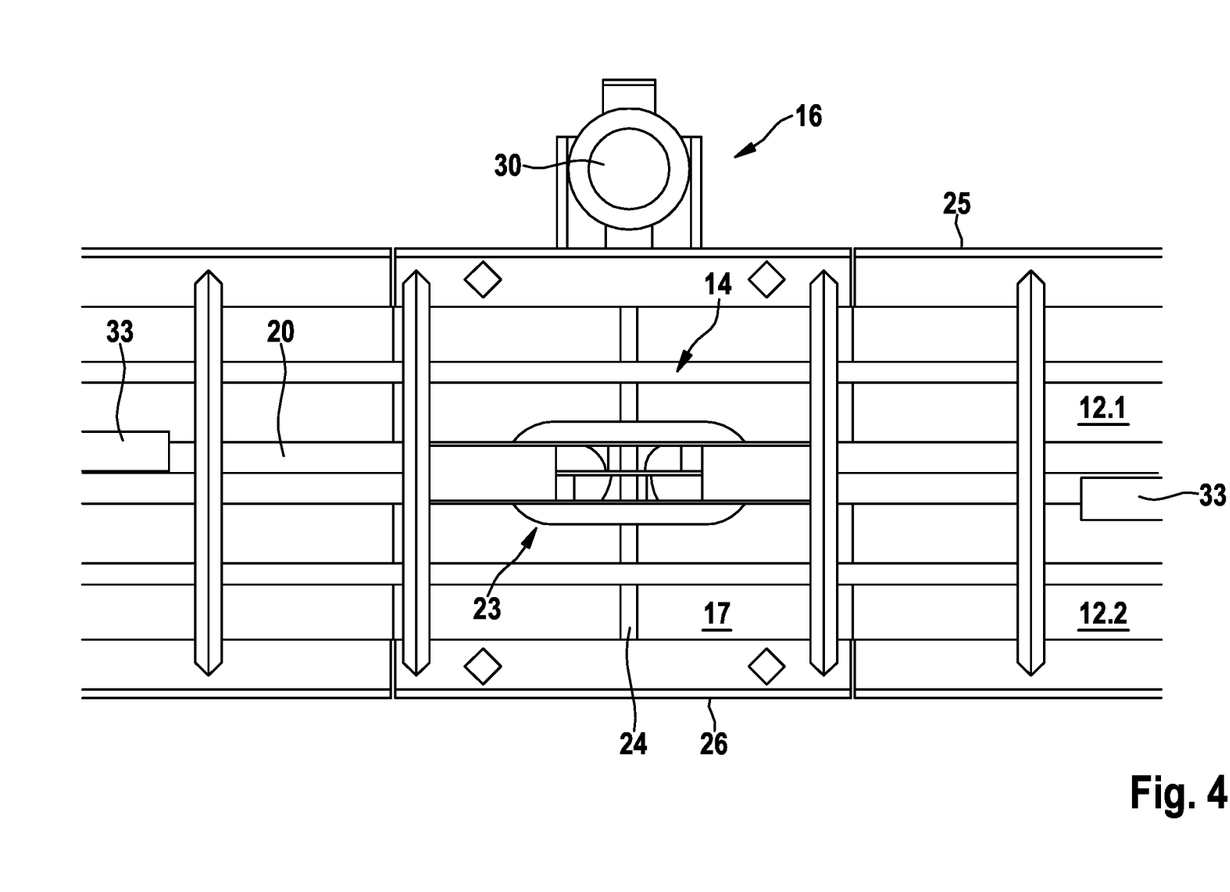
Figure 5:
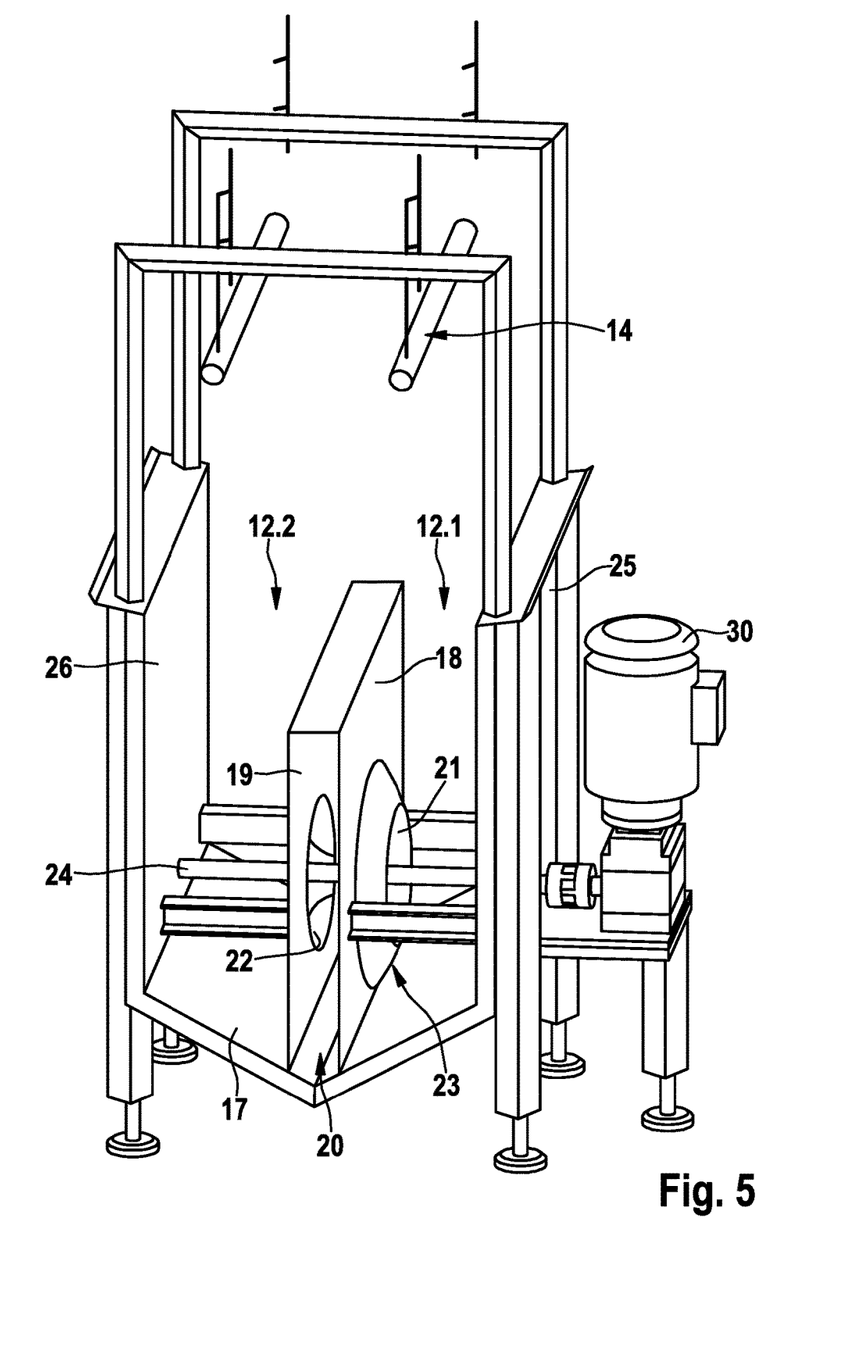

Preferably, at least one deflection element 31, 32 is arranged at both end sides $S_{K1}$, $S_{K2}$ of each channel 20 in the region of the partition walls 18, 19, for deflecting the flow of scalding medium flowing out of the channel 20 at the end sides $S_{K1}$, $S_{K2}$ in the transport direction T of the poultry G. FIG. 3 shows a simple embodiment of a deflection element 31 which is arranged at the end of the U-shaped channel 20 at a partition wall 18, 19, and deflects the flow of scalding medium created by the turbulence-generating body 23 such that the scalding medium in the transport lines 12.1, 12.2, . . . 12.*n* follows the transport direction T of the poultry G in the horizontal direction. The deflection may also be achieved by other deflection elements or similar, e.g. separate from the partition walls 18, 19. Furthermore it is possible to provide a deflection element 31 only at one of the two end sides $S_{K1}$, $S_{K2}$ of the channel 20.

As shown in the drawing, in the region of the channel 20 open at the top, impact elements 33 are arranged for deflecting the scalding medium flowing up out of the open channel 20, to flow downward in the direction of the poultry G. The impact elements 33 may extend over part of the length of the channel 20 or over the entire length. Each impact element 33 may be configured and designed to deflect the flowing medium to the one side (e.g. transport line 12.1) or the other side (e.g. transport line 12.2) or to both sides (e.g. transport lines 12.1 and 12.2). The impact elements 33 are preferably simple guide bodies or similar, with a rounded inner face supporting the flow, which are arranged on one of the partition walls 18, 19.

Figure 6:
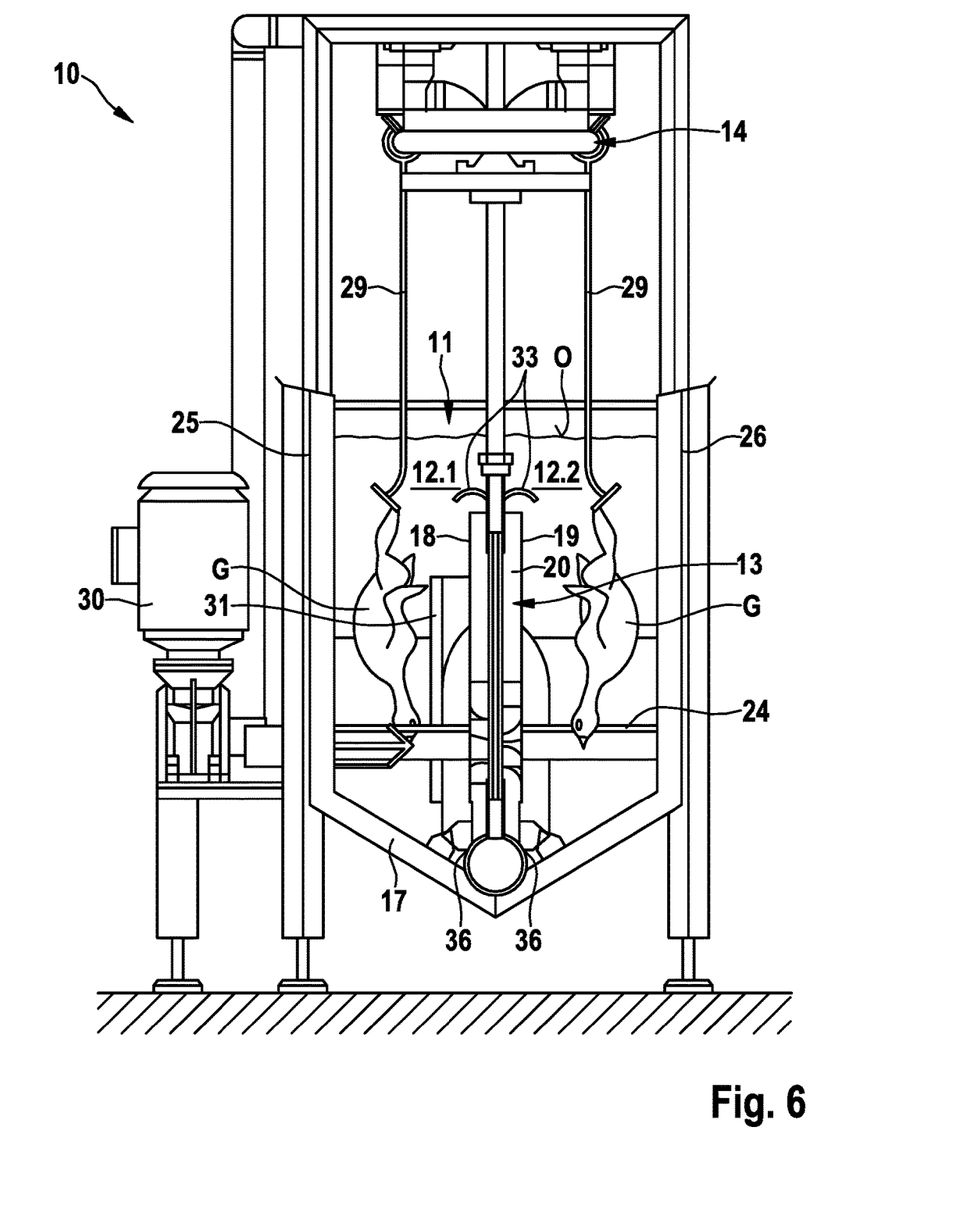

Each pair of partition walls 18, 19 forms the channel 20 which is preferably U-shaped. The partition walls 18, 19 extend up from the base wall 17 of the scalding tank 11, preferably to below the upper edge of the side walls 25, 26 of the scalding tank 11, so that when the scalding tank 11 is filled with scalding medium to the maximum level, the upper edges of the partition walls 18, 19 lies below the surface O of the scalding medium (see e.g. FIGS. 6 and 7). Optionally and preferably, the partition walls 18, 19 are arranged parallel and spaced apart. They may be fixedly connected to the scalding tank 11. Preferably however the partition walls 18, 19 are formed pivotably, in particular for maintenance and cleaning purposes. For this, each partition wall 18, 19 is attached in the region of the base wall 17 of the scalding tank 11 by means of a hinge 36 or similar for pivoting the partition walls 18, 19 out of a parallel operating position into a V-shaped maintenance and/or cleaning position and back. In other words, the partition walls 18, 19 are attached to the base wall 17 by means of a hinge 36 or similar. By means of a locking device (not shown), the partition walls 18, 19 can be fixed at least in their operating position. It is also possible that only one of the partition walls 18, 19 is formed pivotably. Furthermore, only parts of the partition walls 18, 19 may be configured and designed pivotably or foldably in their horizontal and/or vertical extension.

Figure 8:
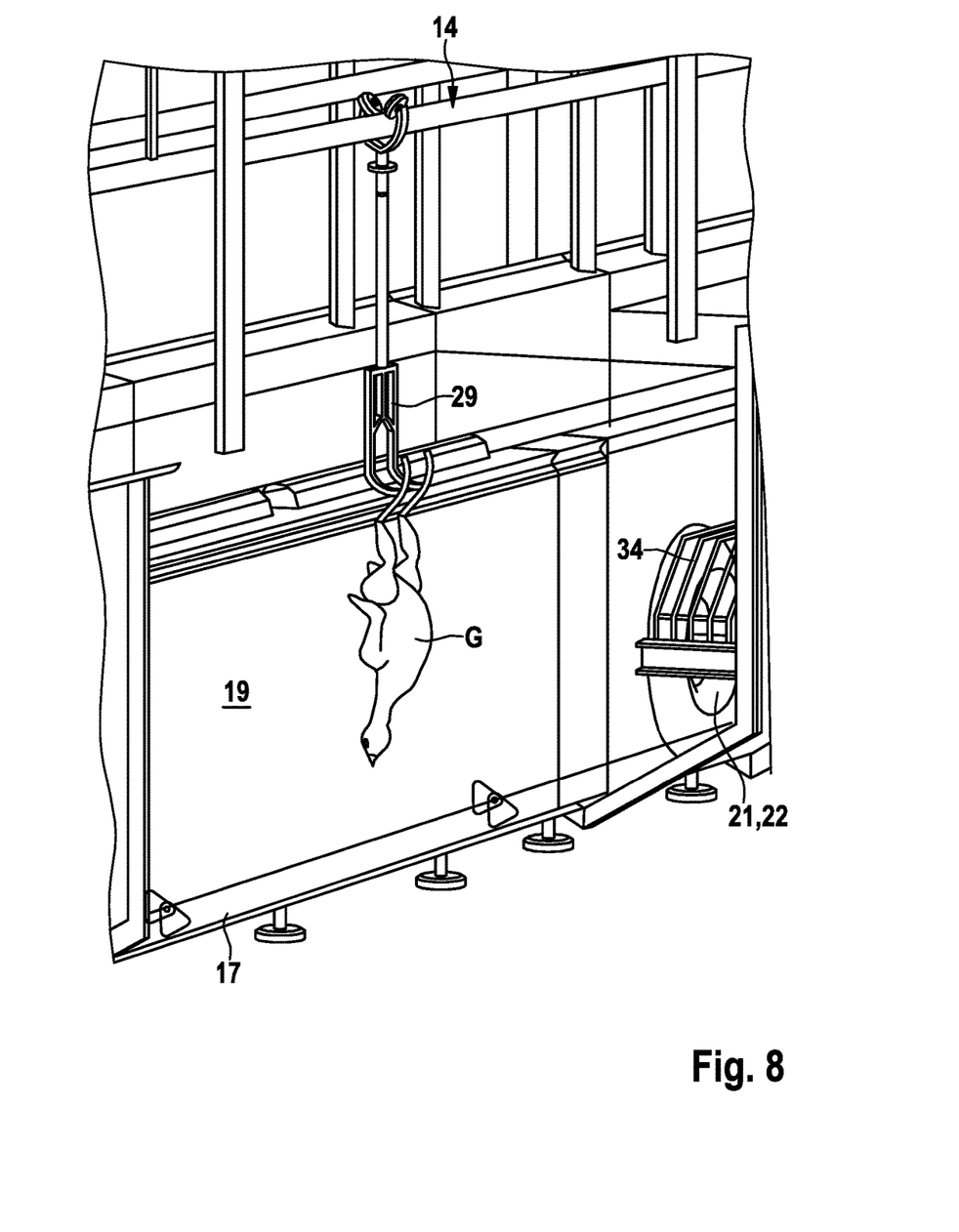

As already described, the turbulence-generating body 23 is arranged inside the channel 20. Each turbulence-generating body 23, in particular in the case where the turbulence-generating body 23 is a simple impeller or propeller, is shielded from the transport lines 12.1, 12.2, . . . 12.*n* in the region of the openings 21, 22 by a protection element 34 which is permeable to the scalding medium. FIG. 8 shows a simple protective grille which prevents the poultry G from being able to come into direct contact with the turbulence-generating body 23. Preferably, the protection element 34 is configured and designed also to shield the drive shaft 24, which extends transversely through the transport lines 12.1, 12.2, . . . 12.*n* and the or each channel 20, from the poultry G.

Figure 2:
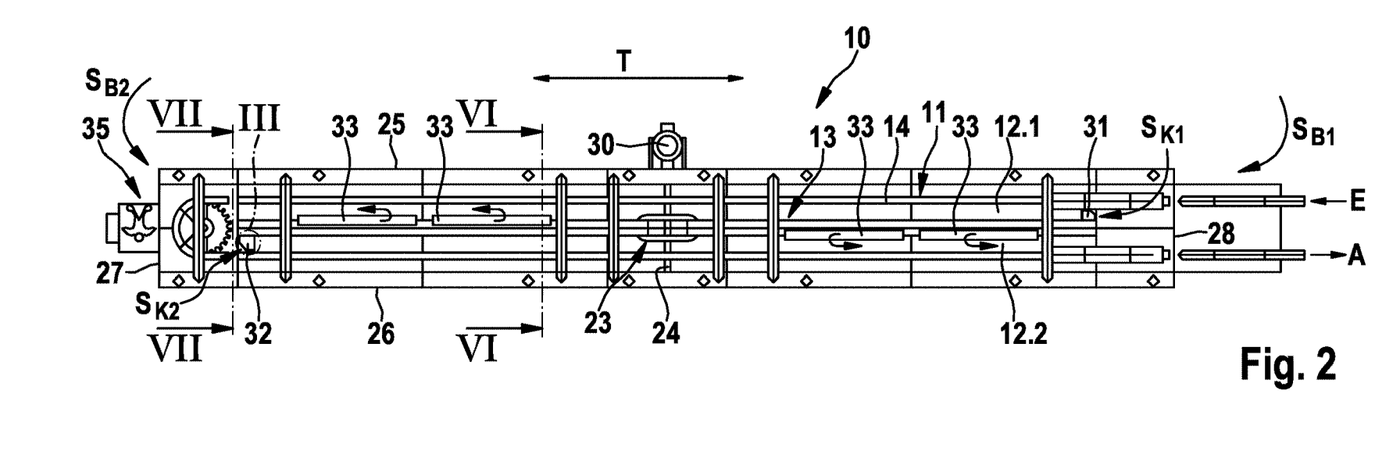

The control and regulating unit 15 for tempering the scalding medium may be arranged at any position inside the apparatus 10. For example, an arrangement of the or each heat source of the control and regulating unit 15 inside the scalding tank 11 in the region of transport lines 12.1, 12.2, . . . 12.*n* is possible. Particularly preferably however, the or each heat source of the control and regulating unit 15 is arranged inside the channel 20. Likewise, a sensor or similar of the control and regulating unit 15 is preferentially arranged inside the channel 20. The filtering device 35, for filtering the scalding medium and/or for controlling and regulating the level of the scalding medium inside the scalding tank 11 and hence inside the transport lines 12.1, 12.2, . . . 12.n and channels 20, can also be arranged at any arbitrary position within the apparatus 10. In the embodiment of FIG. 2, the filtering device 35 is arranged at the end side $S_{B2}$. The filtering device 35 may also be arranged at the end side $S_{B1}$, namely in the area of end side $S_{K1}$ of the channel 20, that is at the end of the partition element 13 between the conveyor rails of transport means 14.

The method for scalding slaughtered poultry which serves to prepare the birds for defeathering will now be described below in more detail with reference to the drawing.

The poultry G suspended by their feet are transported through a scalding tank 11, which is at least partially filled with scalding medium, by means of a transport means 14 along a transport line 12.1, 12.2, . . . 12.n in the transport direction T. In order for the scalding medium to have the desired effect of loosening the feathers, the scalding medium is tempered to the desired scalding temperature by means of a control and regulating unit 15, and this scalding temperature is also controlled and regulated throughout operation. During operation or operating interruptions, the scalding medium is cleaned by a filter device 35. To bring the scalding medium into contact with the poultry as effectively as possible, a turbulence is generated in the scalding medium by means 16 for generating turbulence and/or flow.

According to the invention, the method is distinguished in that the turbulence is generated in the scalding medium in a channel 20 which is shielded at least partially by the or each transport line 12.1, 12.2, . . . 12.n, by means of a turbulence-generating body 23 which can be driven in rotation about a horizontally oriented drive shaft 24 running transversely to the transport direction T, and the scalding medium in supplied again to the or each transport line 12.1, 12.2, . . . 12.n.

For this, the scalding medium is preferably drawn out of the or each transport line 12.1, 12.2, . . . 12.n into the channel 20 by means of the turbulence-generating body 23, whereby a positive pressure is produced in the channel 20 which ensures that the scalding medium emerges from the channel 20 at the end sides $S_{K1}$, $S_{K2}$ and/or at the top and is returned to the transport lines 12.1, 12.2, . . . 12.n. The scalding medium emerging at the end sides $S_{K1}$, $S_{K2}$ of the channel 20 is preferably deflected by means of the deflection elements 31, 32 such that the emerging scalding medium flows in the transport direction T of the poultry G. In other words, the poultry G is always transported with the flow direction of the scalding medium. The scalding medium emerging up out of the channel 20 can be deflected by the impact elements 33 such that the suspended poultry G is charged with the emerging scalding medium from top to bottom against the feather growth.

In a first embodiment, the poultry G is transported along the transport lines 12.1, 12.2, . . . 12.n through a scalding tank 11 which is only partially filled with scalding medium, so that the poultry G is not immersed or only slightly immersed in the scalding medium and is completely or mainly charged with the scalding medium flowing up out of the channel 20. In this embodiment, the poultry G is suspended in the transport lines, but does not touch the scalding medium at all, or is only partly immersed in the scalding medium, for example only as far as the neck, in order to avoid or minimize a retention force occurring during transport through the scalding medium. The scalding medium is only filled in the scalding tank 11 to such a level that it is drawn in by means of the turbulence-generating body 23, in particular by means of the vortex water turbine, into the channel 20 and out of this, and returned via the impact elements 33 from top to bottom over the poultry G. In this case, the scalding takes place substantially by the scalding medium flowing up out of the channel 20.

Figure 7:
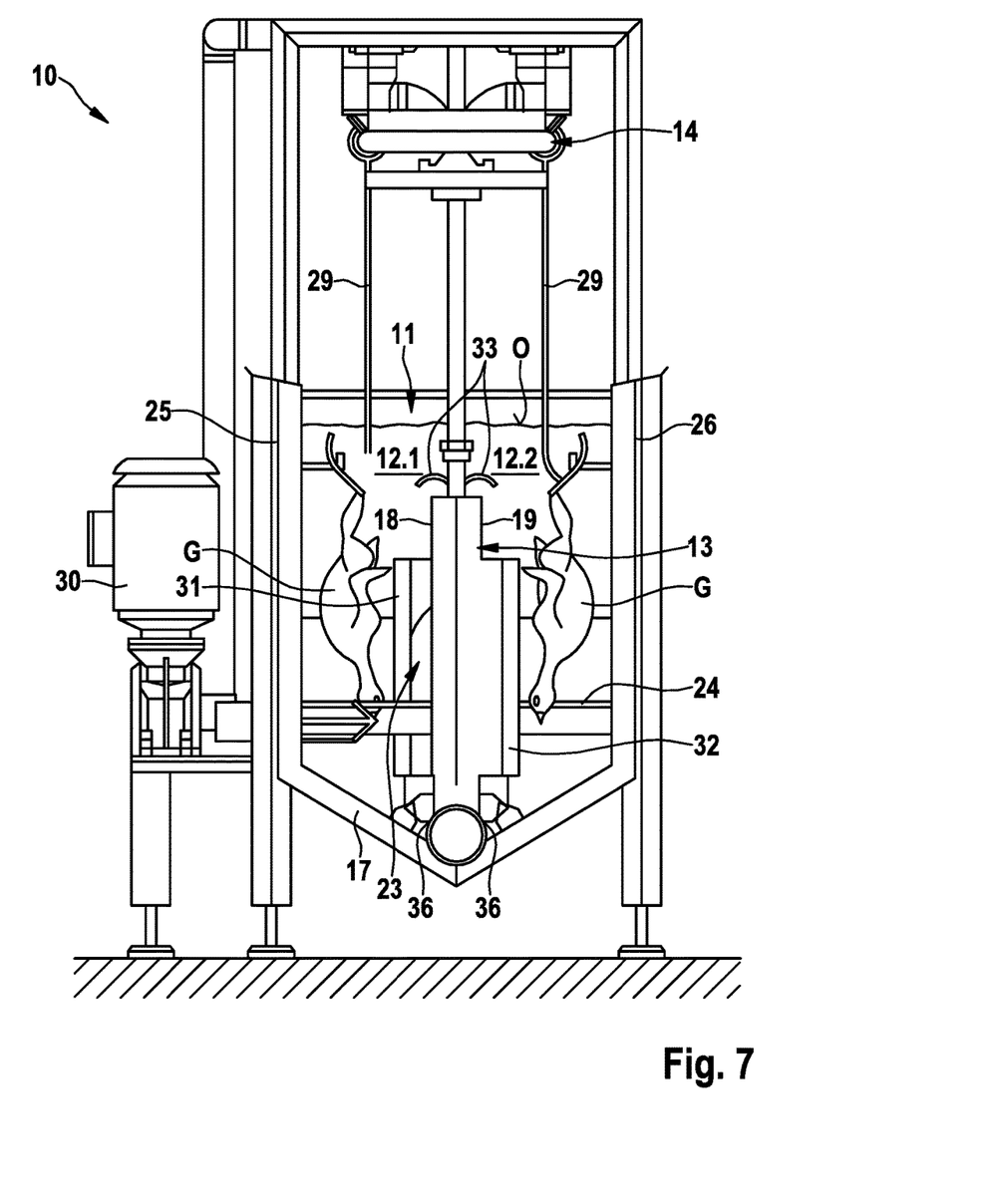

Alternatively, the poultry G is transported along the transport lines 12.1, 12.2, . . . 12.n through a scalding tank 11 which is completely filled with scalding medium, so that the poultry G is fully immersed in the scalding medium and is charged with the scalding medium standing in the transport lines 12.1, 12.2, . . . 12.n and to the scalding medium flowing up and/or at the end sides out of the channel 20 (see for example FIG. 7). The scalding medium flowing out of the channel 20 generates a turbulence in the scalding medium standing in the transport lines 12.1, 12.2, . . . 12.n, so that this ensures particularly effective charging of the poultry G with the scalding medium.

Figure 9:
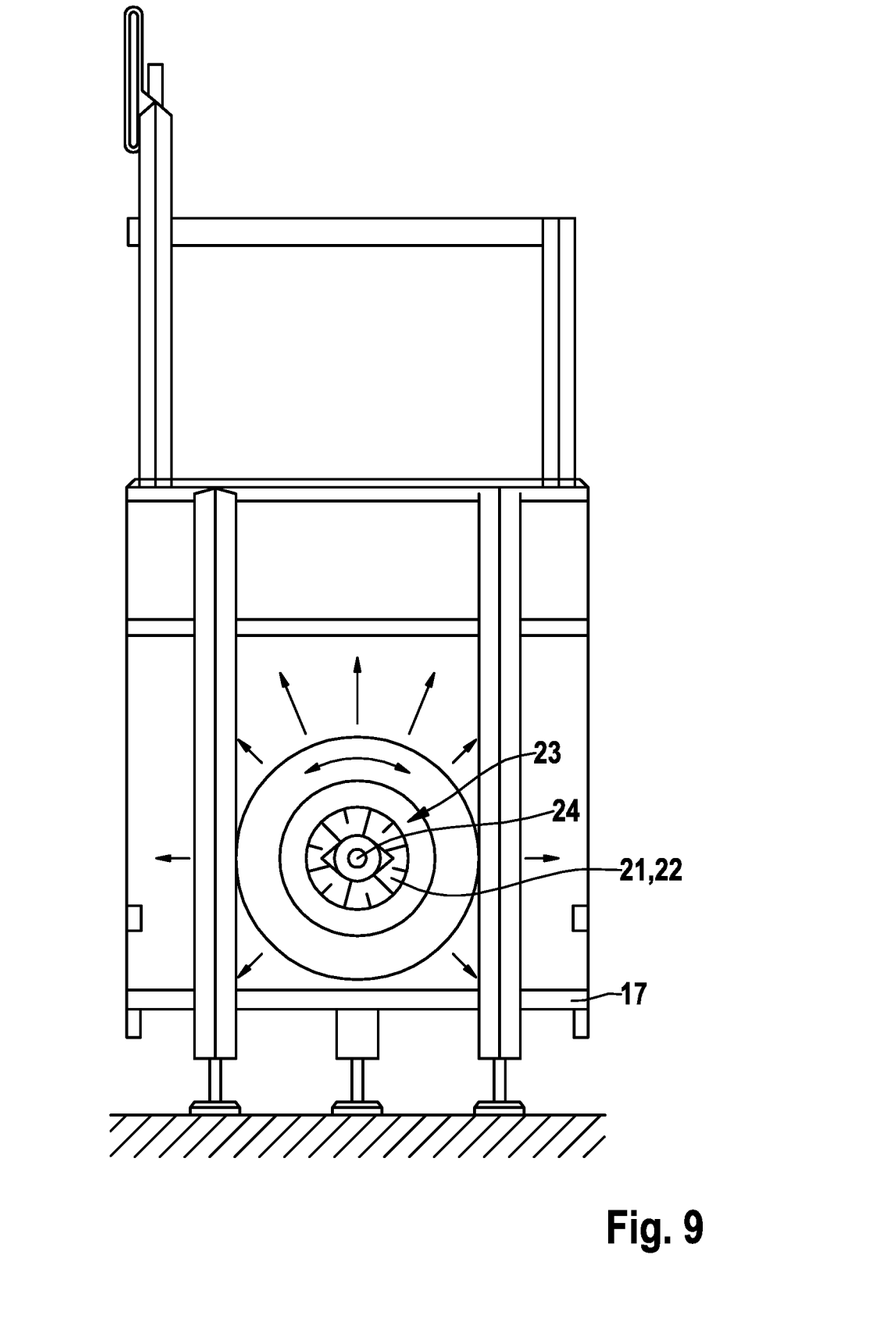

Preferably, the scalding medium is tempered inside the channel 20 by the control and regulating unit 15, wherein on emergence from the channel 20, the scalding medium tempered in the channel 20 mixes with the scalding medium present in the transport lines 12.1, 12.2, . . . 12.n and this mixture of scalding medium then hits the poultry G. FIG. 9 indicates diagrammatically the effect of the turbulence-generating body 23 and in particular the vortex water turbine, namely the generation of turbulence in the scalding medium such that the scalding medium is deflected inside the channel 20 evenly in all directions to generate a positive pressure.

The apparatus 10 according to the invention is particularly suitable for performance of the method.

The invention claimed is:

1. An apparatus, configured and adapted for scalding slaughtered poultry, comprising a linear scalding tank open at the top for receiving and holding a scalding medium, with at least one transport line for the poultry, wherein each transport line in its longitudinal extension borders a partition element extending over at least part of the length of the transport line, a transport means arranged above the scalding tank for transporting the poultry suspended by the feet along the transport line in the transport direction, a control and regulating unit for tempering the scalding medium, means for generating a turbulence and/or flow in the scalding medium, and a filtering device for cleaning the scalding medium, characterized in that each partition element comprises two partition walls spaced apart from each other and extending upward from the base wall of the scalding tank to form a channel open at the top and at the end sides, and inside the channel in the region of openings in each partition wall facing a transport line, a turbulence-generating body is arranged as a means for creating turbulence and/or flow in the scalding medium, which can be driven in rotation by a horizontally oriented drive shaft running transversely to the transport direction of the poultry.

2. The apparatus according to claim 1, characterized in that at least two parallel transport lines are formed in the scalding tank which are at least partially separated from each other in their longitudinal extension by the partition element.

3. The apparatus according to claim 1, characterized in that more than two parallel transport lines are formed in the scalding tank, wherein two adjacent transport lines are in each case at least partially separated from each other by a partition element.

4. The apparatus according to claim 1, characterized in that the turbulence-generating body comprises at least one impeller, propeller or similar.

5. The apparatus according to claim 1, characterized in that the turbulence-generating body comprises at least two impellers, propellers or similar arranged on the same drive shaft.

6. The apparatus according to claim 1, characterized in that at both ends of each channel in the region of the partition walls, at least one deflection element is arranged for deflecting the scalding medium flowing out of the channel at the ends in the transport direction of the poultry.

7. The apparatus according to claim 1, characterized in that in the region of the channel open at the top, impact elements are arranged for deflecting the scalding medium flowing up out of the channel, to flow down in the direction of the poultry.

8. The apparatus according to claim 7, characterized in that the impact elements extend substantially over the entire length of the channel and are configured and adapted to deflect the scalding medium from the channel optionally into the one and/or the other transport line.

9. The apparatus according to claim 1, characterized in that the two partition walls forming a channel are configured pivotably for maintenance and/or cleaning purposes.

10. The apparatus according to claim 9, characterized in that each partition wall is fitted with a hinge or similar in the region of the base wall of the scalding tank for pivoting of the partition walls out of a parallel operating position into a V-shaped maintenance and/or cleaning position and back.

11. The apparatus according to claim 1, characterized in that each turbulence-generating body is shielded from the transport lines in the region of the openings by a protective element which is permeable to the scalding medium.

12. The apparatus according to claim 1, characterized in that at least one heat source of the control and regulating unit is arranged inside the channel for tempering the scalding medium.

13. A method for scalding slaughtered poultry with the steps:
   transport of the poultry hanging by the feet through a scalding tank which is at least partially filled with scalding medium, by a transport means along a transport line in transport direction,
   tempering of the scalding medium by a control and regulating unit,
   cleaning of the scalding medium by a filter device, and
   generation of turbulence in the scalding medium by a means for generating turbulence and/or flow,
characterized in that turbulence is generated in the scalding medium in a channel which is at least partially shielded from the or each transport line, by a turbulence-generating body which is rotatably driven by a horizontally oriented drive shaft running transversely to the transport direction, and the scalding medium is then returned to the or each transport line.

14. The method according to claim 13, characterized in that the scalding medium is drawn from the or each transport line into the channel by the turbulence-generating body, and thereby a positive pressure is produced in the channel which ensures that the scalding medium emerges at the end sides and/or top of the channel and is returned to the transport lines.

15. The method according to claim 14, characterized in that the scalding medium emerging from the end sides of the channel is deflected by deflection elements such that the emerging scalding medium flows in the transport direction of the poultry.

16. The method according to claim 13, characterized in that the scalding medium emerging up out of the channel is deflected by impact elements such that the suspended poultry is charged with the emerging medium from top to bottom.

17. The method according to claim 13, characterized in that the poultry is transported along the transport lines through a scalding tank which is only partly filled with scalding medium, so that the poultry is not immersed or is only partly immersed in the scalding medium and is completely or mainly charged with the scalding medium flowing up out of the channel.

18. The method according to claim 13, characterized in that the poultry is transported along the transport lines through a scalding tank which is completely filled with scalding medium, so that the poultry is immersed completely in the scalding medium and is charged with the scalding medium standing in the transport lines and by the scalding medium flowing up and/or at the end sides out of the channel.

19. The method according to claim 13, characterized in that the scalding medium inside the channel is tempered by the control and regulating unit, wherein on flowing out from the channel, the scalding medium tempered in the channel is mixed with the scalding medium present in the transport lines and this mixture of scalding medium then hits the poultry.

20. The method according to claim 13, characterized in that it is carried out with an apparatus configured and adapted for scalding slaughtered poultry, comprising a linear scalding tank open at the top for receiving and holding a scalding medium, with at least one transport line for the poultry, wherein each transport line in its longitudinal extension borders a partition element extending over at least part of the length of the transport line, a transport means arranged above the scalding tank for transporting the poultry suspended by the feet along the transport line in the transport direction, a control and regulating unit for tempering the scalding medium, means for generating a turbulence and/or flow in the scalding medium, and a filtering device for cleaning the scalding medium, characterized in that each partition element comprises two partition walls spaced apart from each other and extending upward from the base wall of the scalding tank to form a channel open at the top and at the end sides, and inside the channel in the region of openings in each partition wall facing a transport line, a turbulence-generating body is arranged as a means for creating turbulence and/or flow in the scalding medium, which can be driven in rotation by a horizontally oriented drive shaft running the transversely to the transport direction of the poultry.

* * * * *